(12) United States Patent
Wuisan et al.

(10) Patent No.: US 8,757,315 B1
(45) Date of Patent: Jun. 24, 2014

(54) DRIVETRAIN RANGE SELECTOR CONTROL

(71) Applicant: Deere & Company, Moline, IL (US)

(72) Inventors: Giovanni Ananda Wuisan, Epworth, IA (US); Charles Jon Paul Asp, Epworth, IA (US); Nathan Joseph Hortsman, Durango, IA (US); Ronald James Huber, Dubuque, IA (US); Daniel Robert Klein, Peosta, IA (US); Jed Douglas Polzin, Platteville, WI (US); Brent Allen Smith, Peosta, IA (US)

(73) Assignee: Deere & Company, Moline, IL (US)

( * ) Notice: Subject to any disclaimer, the term of this patent is extended or adjusted under 35 U.S.C. 154(b) by 0 days.

(21) Appl. No.: 13/854,195

(22) Filed: Apr. 1, 2013

(51) Int. Cl.
*B60K 20/00* (2006.01)

(52) U.S. Cl.
USPC ............................. 180/315; 180/333

(58) Field of Classification Search
USPC .................. 180/315, 317, 323, 333, 334, 336
See application file for complete search history.

(56) References Cited

U.S. PATENT DOCUMENTS

| | | | | |
|---|---|---|---|---|
| RE31,646 E | * | 8/1984 | Beals et al. | 180/78 |
| 6,039,141 A | * | 3/2000 | Denny | 180/329 |
| 6,061,617 A | * | 5/2000 | Berger et al. | 701/50 |
| 6,131,062 A | * | 10/2000 | Nielsen | 701/50 |
| H2024 H | * | 6/2002 | Kelley et al. | 74/491 |
| 7,117,970 B2 | * | 10/2006 | Shiomi et al. | 180/315 |
| 7,137,475 B2 | * | 11/2006 | Shiomi et al. | 180/315 |
| 2002/0166267 A1 | * | 11/2002 | McGugan | 37/348 |
| 2006/0144634 A1 | * | 7/2006 | Portscheller et al. | 180/330 |
| 2007/0253840 A1 | * | 11/2007 | Harber et al. | 417/323 |
| 2007/0295551 A1 | * | 12/2007 | Proud et al. | 180/333 |
| 2009/0223734 A1 | | 9/2009 | Frett et al. | |

* cited by examiner

*Primary Examiner* — Toan To
(74) *Attorney, Agent, or Firm* — Taft Stettinius & Hollister LLP; Stephen F. Rost (57) ABSTRACT

The present disclosure provides a control system for a machine having a transmission. The control system includes an open gate shift pattern having a plurality of defined positions disposed within an outer perimeter. Each of the defined positions corresponds to one of a plurality of forward and reverse ranges of the transmission. A control lever is movably disposed within the shift pattern. A first set of defined positions is aligned in the shift pattern corresponding to the plurality of forward ranges and a second set of defined positions is aligned in the shift pattern corresponding to the plurality of reverse ranges. The control lever is moveable in a single movement to any of the plurality of defined positions for selecting between a forward range and reverse range.

20 Claims, 6 Drawing Sheets

DRIVETRAIN RANGE SELECTOR CONTROL

FIELD OF THE DISCLOSURE

The present disclosure relates to a drivetrain range selector control for controlling a machine, such as a motor grader.

BACKGROUND OF THE DISCLOSURE

Work machines, such as a motor grader, can be used in construction and maintenance for creating a flat surface. When paving a road, a motor grader can be used to prepare a base foundation to create a wide flat surface for asphalt to be placed on. A motor grader can include two or more axles, with an engine and cab disposed above the axles at the rear end of the vehicle and another axle disposed at the front end of the vehicle. A blade is attached to the vehicle between the front axle and rear axle.

An experienced machine operator can learn to operate the machine based on a learned "feel" of the machine. In addition, either during operation or at idle, the operator can often anticipate what range the machine is operating in based on an angle at which a shift lever or control is disposed and the speed at which the machine is moving. However, during operation, the operator may be required to accurately and simultaneously control several different control operations of the machine to maintain a desired level of productivity. For example, an operator may use one hand to maneuver a plurality of control knobs, levers, buttons, etc. to maneuver the blade mounted to the grader. However, if the operator desires to shift the grader into a different range or direction, the shift controls are often located on a different control console. In this instance, the operator has to remove his or her hand from the blade controls, reach with his or her hand to the shift controls, make the desired shift, and then return his or her hand to the blade controls to continue the grading operation.

In some instances, it may take a significant amount of time to make the desired shift using the shift controls. In doing so, the operator is at least briefly not controlling the blade, and in other instances the operator may have to discontinue the grading operation before shifting the machine into the desired range. In any event, productivity can be undesirably affected.

A need therefore exists to provide a shift pattern that allows the operator to make a single movement of a shift control to adjust the direction and speed of the machine.

SUMMARY

In an exemplary embodiment of the present disclosure, a control system is provided for a machine having a variable speed drivetrain, where the variable speed drivetrain includes a plurality of selectable forward and reverse ranges. The control system includes an open gate shift pattern having an outer perimeter and a plurality of defined positions disposed within the outer perimeter, where each of the defined positions corresponds to one of the plurality of selectable forward and reverse ranges of the variable speed drivetrain. A control lever is movably disposed within the shift pattern, where movement of the control lever induces a shift of the variable speed drivetrain. A first set of defined positions is aligned in the shift pattern corresponding to each of the plurality of forward ranges, a second set of defined positions is aligned in the shift pattern corresponding to each of the plurality of reverse ranges, and a third set of defined positions includes at least one defined position corresponding to neutral and another defined position corresponding to park. The control lever is moveable in a single step to any of the plurality of defined positions for selecting between a corresponding forward range and reverse range.

In one aspect, the first set of defined positions and the second set of defined positions are substantially aligned in a longitudinal direction, the first set of defined positions being laterally spaced from the second set of defined positions. In another aspect, the control lever is moveable laterally between any one of the first set of defined positions and any one of the second set of defined positions. In a further aspect, the control lever is moveable in the longitudinal direction between any one of the defined positions in the first set or second set thereof. In a different aspect, the third set comprises a plurality of defined positions corresponding to neutral, the plurality of defined positions corresponding to neutral being substantially aligned in the longitudinal direction between the first set and second set of defined positions.

In yet another aspect, the third set comprises a plurality of defined positions corresponding to neutral, the plurality of defined positions corresponding to neutral being substantially aligned in a transverse direction with the defined position corresponding to park. Moreover, the control system can include a shift mechanism disposed outside of the outer perimeter, where actuation thereof is configured to limit movement of the control lever to and from the defined position corresponding to park. In addition, the outer perimeter is substantially rectangular and includes a portion protruding therefrom, the defined position corresponding to park being disposed within the protruding portion of the outer perimeter.

In another embodiment, a motor grader includes a front frame, a rear frame, a traction device positioned to support the front frame and rear frame, an engine, and a variable speed drivetrain mounted to the front or rear frame. The variable speed drivetrain includes a plurality of selectable ranges. The motor grader also includes a grader blade supported by the front and rear frames, a cab mounted to the rear frame, and a control system disposed in the cab. The control system includes a plurality of inputs configured to control at least one function of the motor grader. A shift assembly is disposed in the cab and includes an open gate shift pattern and a control lever moveably disposed within the shift pattern, the shift pattern having an outer perimeter and a plurality of defined positions disposed within the outer perimeter, where each of the defined positions corresponds to one of the plurality of ranges of the variable speed drivetrain. A first set of defined positions correspond to one or more forward ranges, a second set of defined positions correspond to one or more reverse ranges, and a third set of defined positions correspond to neutral and park. Moreover, the control lever is moveable in a single step to any of the plurality of defined positions for selecting between one forward range and one reverse range.

In one aspect, a console is positioned in the cab and supports the control system and shift assembly. In another aspect, a shift mechanism is linked to the control lever, where actuation of the shift mechanism limits movement of the control lever to and from the defined position corresponding to park in the shift pattern. In a different aspect, the shift pattern is free of any area between the first set of defined positions and the second set of defined positions that restricts a direct linear movement of the control lever therebetween. In yet another aspect, the first set of defined positions and the second set of defined positions are substantially aligned in a longitudinal direction, the first set of defined positions being laterally spaced from the second set of defined positions. Moreover, the third set comprises a plurality of defined positions corresponding to neutral, the plurality of defined positions corresponding to neutral being substantially aligned in the longitudinal direction between the first set and second set of defined positions.

In a different embodiment, a construction machine includes a chassis, a traction device positioned to support and propel the chassis, and a variable speed drivetrain mounted to the chassis. The variable speed drivetrain includes a plurality of selectable ranges. The machine also includes a work implement supported by the chassis, a cab supported by the chassis and includes controls for controlling the machine, and a control system is disposed in the cab. The control system includes a plurality of inputs where at least one of the plurality of inputs is configured to control the work implement. The machine also includes a shift assembly disposed in the cab, where the shift assembly includes an open gate shift pattern and a control lever. The shift pattern has an outer perimeter and a plurality of defined positions disposed within the outer perimeter, where each of the defined positions corresponds to one of the plurality of selectable forward and reverse ranges of the variable speed drivetrain. The control lever is movably disposed within the shift pattern, where movement of the control lever induces a shift of the variable speed drivetrain. A first set of defined positions is aligned in the shift pattern corresponding to each of the plurality of forward ranges, a second set of defined positions is aligned in the shift pattern corresponding to each of the plurality of reverse ranges, and a third set of defined positions includes at least one defined position corresponding to neutral and another defined position corresponding to park. The control lever is moveable in a single step to any of the plurality of defined positions for selecting between a corresponding forward range and reverse range.

In one aspect, a single console is positioned in the cab and is structured such that the control system and shift assembly are integrated into the single console. In a related aspect, the control lever is spaced no more than 3 inches from the nearest of the plurality of inputs. In another aspect, a shift mechanism can be coupled to the single console and electronically linked to the control lever, where actuation of the shift mechanism limits movement of the control lever to and from the defined position corresponding to park in the shift pattern. In a different aspect, the first set of defined positions and the second set of defined positions are substantially aligned in a longitudinal direction, the first set of defined positions being laterally spaced from the second set of defined positions. The third set of defined positions comprises a plurality of defined positions corresponding to neutral, the plurality of defined positions corresponding to neutral being substantially aligned in the longitudinal or transverse direction relative to the first set and second set of defined positions. Moreover, the control lever is moveable between the first set, second set, and third set of defined positions in a lateral direction, a longitudinal direction, or an angular direction relative to the lateral and longitudinal directions.

BRIEF DESCRIPTION OF THE DRAWINGS

The above-mentioned aspects of the present disclosure and the manner of obtaining them will become more apparent and the disclosure itself will be better understood by reference to the following description of the embodiments of the disclosure, taken in conjunction with the accompanying drawings, wherein.

Corresponding reference numerals are used to indicate corresponding parts throughout the several views.

DETAILED DESCRIPTION

The embodiments of the present disclosure described below are not intended to be exhaustive or to limit the disclosure to the precise forms in the following detailed description. Rather, the embodiments are chosen and described so that others skilled in the art may appreciate and understand the principles and practices of the present disclosure.

Figure 6:
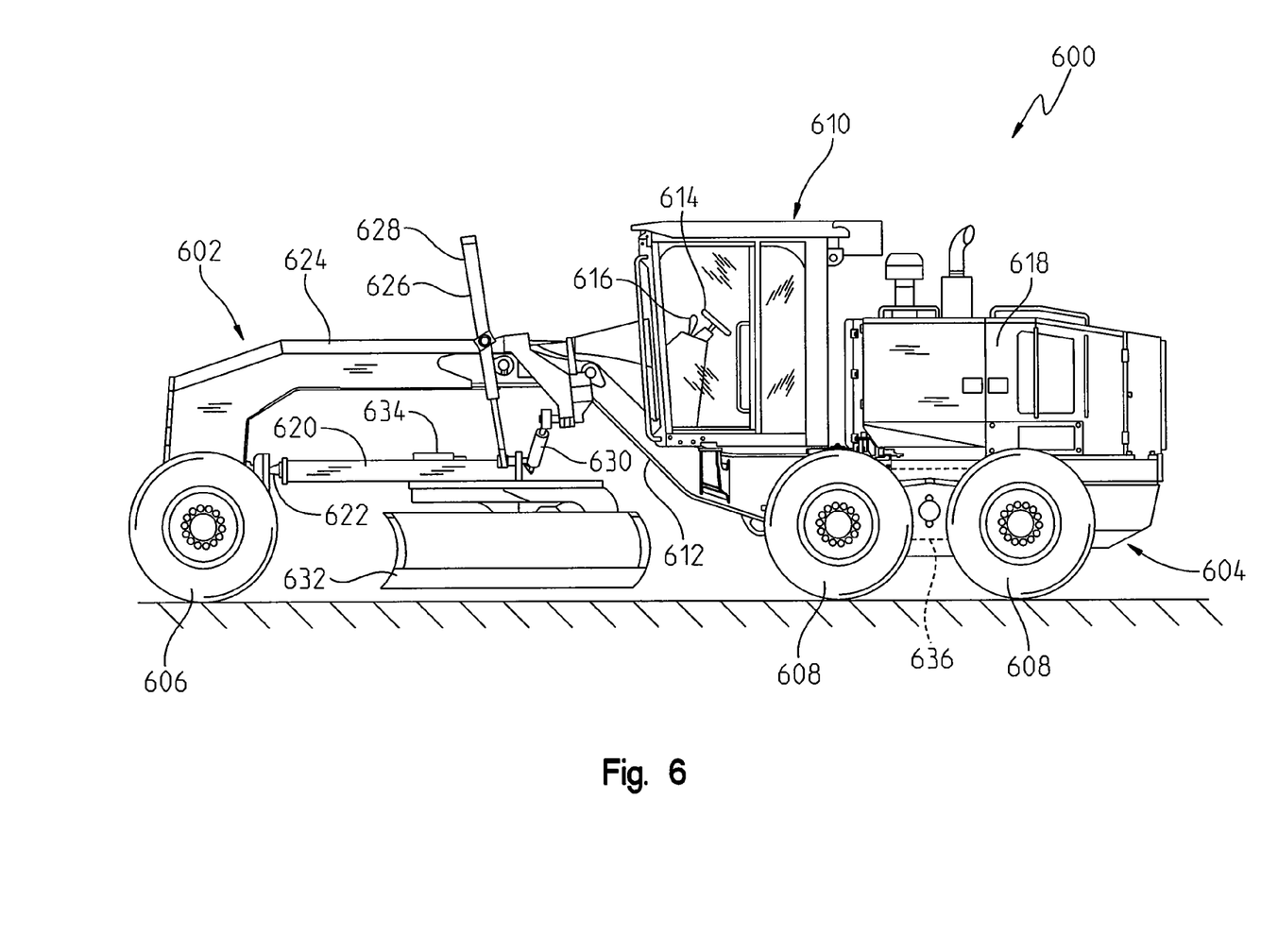
FIG. 6 is a side elevation view of a motor grader showing the motor grader including a support frame or chassis, a cab supported by the chassis, a work implement mounted below the chassis, and a plurality of wheels or traction devices supporting the chassis on the ground.

Referring to FIG. 6, an exemplary embodiment of a machine, such as a motor grader 600, is shown for spreading and leveling dirt, gravel, or other materials. An example of a motor grader is the 772G Motor Grader manufactured and sold by Deere & Company. As shown in FIG. 6, the motor grader 600 includes an articulated chassis formed by front and rear frames 602 and 604, respectively. The front frame 602 is supported by a pair of front wheels 606, and the rear frame 604 is supported on right and left tandem sets of rear wheels 608. The front and rear wheels may take the form of any type of traction device depending on the machine.

An operator cab 610 is mounted on an upwardly and forwardly inclined rear region 612 of the front frame 602. An engine 618 is mounted on the rear frame 604 and supplies power for all driven components of the motor grader 600. The engine 618, for example, can be configured to drive a transmission 636 or other power-transferring drivetrain, which is coupled for driving the rear wheels 608 at various selected speeds and either in forward or reverse modes. A hydrostatic front wheel assist transmission (not shown) may be selectively engaged to power the front wheels 606, in a manner known in the art. For purposes of this disclosure, the term "transmission" can refer to any power-transferring, variable speed device or drivetrain. This can include a transaxle or electric drivetrain machine without a gear box.

Mounted to a front location of the front frame 602 is a drawbar or draft frame 620, having a forward end universally connected to the front frame 602 by a ball and socket arrangement 622 and having opposite right and left rear regions suspended from an elevated central section 624 of the front frame 602 by right and left lift linkage arrangements including right and left extensible and retractable hydraulic actuators 626 and 628, respectively. A side shift linkage arrangement is coupled between the elevated frame section 624 and a rear location of the drawbar 620 and includes an extensible and retractable side swing hydraulic actuator 630. A blade 632 is coupled to the front frame 602 and powered by a circle drive assembly 634.

The features described above and shown in FIG. 6 may be provided on other machines or vehicles including a bull dozer, front loader, and other construction machines having one or more ground engaging work tools or implements and traction devices, such as wheels and tracks. Moreover, the blade 632 of the motor grader 600 may also take the form of other known ground-engaging tools such as a snow plow and may engage other materials besides dirt, gravel, sand, etc.

The operator cab 610 of FIG. 6 can include a front wall, a pair of side walls, a rear wall, a roof, and a floor that define an interior space of the operator cab 610. Windows can be formed in any one of the walls. In the interior space, the operator cab 610 can include at least one operator's seat positioned therein and various controls for operating the motor grader 600 disposed so as to be within the reach of an operator. In one aspect, these controls may include a steering wheel 614 and a shift assembly 616. The steering wheel 614 can control the steering of the motor grader 600. The shift assembly 616 may be used for controlling the transmission 636. Although not shown in FIG. 6, the shift assembly 616 can be structured as part of a console assembly that is positioned within the interior space and adjacent to the operator's seat. This allows the operator to sit in the seat and be able to reach the lever assembly 616 to control the transmission 636.

To operably control the transmission 636, the shift assembly 616 can include a shift lever, joystick or other control mechanism. The shift assembly 616 can include a defined shift pattern for controlling the transmission and the direction at which the machine moves (e.g., forward or reverse). In particular, the transmission can be shifted between one or more selective ranges. For purposes of this disclosure, the term "range" is intended to refer to a specific speed or gear ratio. Moreover, the term "shift" can refer to a "change in gear ratio", a "change in speed ratio", or simply a "change in range". In a discrete or fixed ratio transmission, each shift of the transmission results in a shift between a first range having a first fixed gear ratio and a second range having a second fixed gear ratio, where the first and second ratios are different from one another. Alternatively, in a non-discrete transmission, e.g., a continuously-variable transmission, infinitely-variable transmission, etc., movement of the shifter between ranges may result in a shift between a first range corresponding to a first transmission output speed and a second range corresponding to a second transmission output speed, where the first transmission output speed and second transmission output speed are different from one another.

Figure 1:
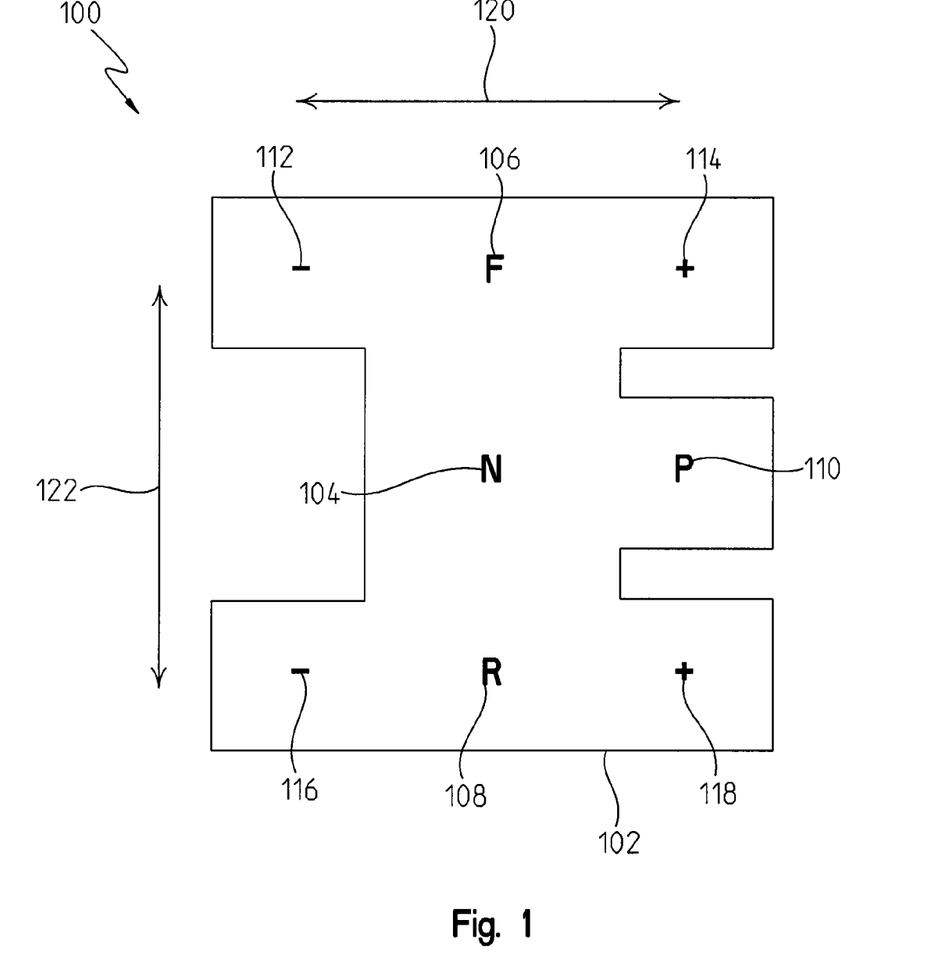
FIG. 1 is a conventional bump shift pattern for controlling speed and direction of a machine.

Referring to FIG. 1, for example, a conventional bump shift pattern 100 is shown. With bump shifting, a shifter or lever (not shown) can be simply "bumped" or moved in a single motion either in a forward or reverse direction to shift the transmission between ranges. For instance, in FIG. 1 the bump shift pattern 100 includes an outer perimeter that defines the pattern 100. The pattern 100 includes a forward position 106, a neutral position 104, a reverse position 108, and a park position 110. For purposes of this shift pattern 100, the term "position" refers to the location in the shift pattern 100 (i.e., forward position 106 is located towards the top of the shift pattern 100 and reverse is located towards the bottom thereof).

If the transmission is operating in neutral, an operator can shift the transmission into a forward range by moving the shifter in a longitudinal direction 122 to the forward position 106 in the shift pattern 100. Once the shifter is disposed in the forward position 106, it is biased to that position. Thus, if the operator desires to increase from a first forward range to a second forward range, the operator moves the shifter in a lateral direction 120 towards the "increase" position 114. As the shifter is moved or "bumped" to the increase position 114, the transmission will shift into a higher range. Once the shifter is moved to the increase position 114, however, the shifter is biased towards and returns to the forward position 106. If the operator desires to increase the range from the second forward range to a third forward range, the operator has to move the shifter to the "increase" position 114 again. Therefore, for each increase in range, the operator has to move or "bump" the shifter to the "increase" position 114.

Likewise, if the operator wants to decrease the forward range, the operator has to move or "bump" the shifter to a "decrease" position 112 to reduce the range. Moreover, to shift into reverse, the operator has to move the shifter to the reverse position 108, and to increase range the shifter is moved to the "increase" position 118 and to decrease the range the shifter is moved to the "decrease" position 116. Similar to the forward position 106, the shifter is biased to return to the reverse position 108 after each increase or decrease in range selection. Thus, based only on the conventional bump shift pattern 100, an operator can only determine what direction but not what range the machine is operating in.

In other conventional bump shift patterns, the shifter may automatically return to a neutral or intermediate position after being actuated either in the forward or reverse direction. As a result, the operator often cannot determine what direction or range the transmission is operating in based solely on the position of the shifter in the shift pattern. In most conventional arrangements, the operator may only determine range based on a machine's travelling speed or via a range indicator on a monitor or display in the cab.

Figure 2:
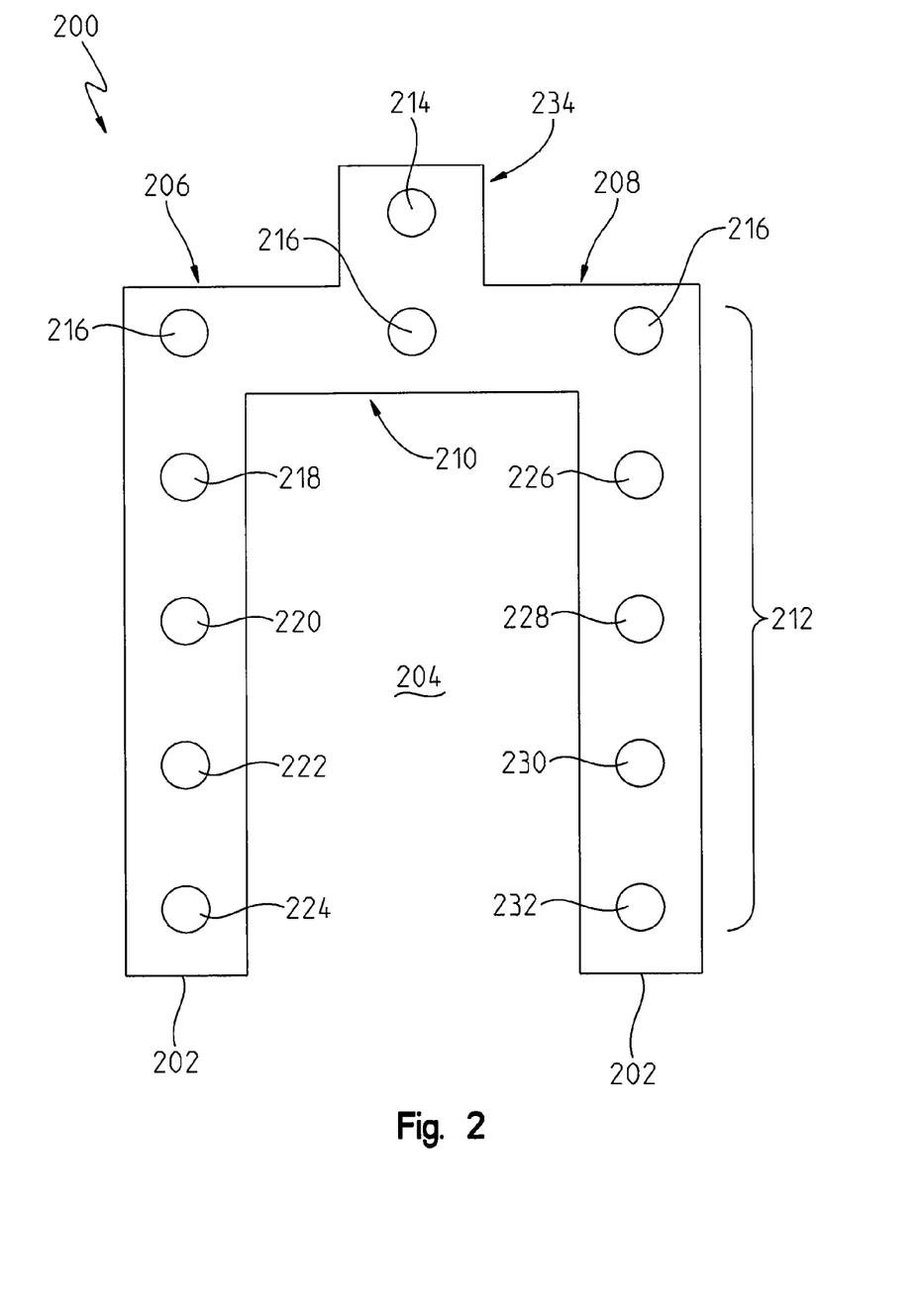
FIG. 2 is a conventional Y-gate shift pattern for controlling speed and direction of a machine.

Referring to FIG. 2, another conventional shift pattern 200 is shown as having a substantially upside-down Y-shaped pattern. This shift pattern is commonly referred to as a sequential shift pattern. Here, a shifter can be moved through the shift pattern 200 to operate the transmission 136 sequentially through ranges. The shift pattern 200 is defined by an outer boundary or perimeter 202 that forms a fork having a first section 206 and a second section 208. The first section 206 is spaced from the second section 208 such that an intermediate area 204 is defined therebetween.

The first section 206 and second section 208 are interconnected with one another by a transverse section 210. In this arrangement, the shift pattern 200 defines a passageway along which a shifter or shift lever may be controllably moved for shifting the transmission 136 between ranges and to change directions. For purposes of this disclosure, the term "range" can refer to a specific or desired range of the transmission. The specific or desired range can have a defined gear ratio, such that a shift from one range to another results in the transmission 136 shifting from a first gear ratio to a second gear ratio, where the first gear ratio and second gear ratio are different from one another.

In the Y-gate shift pattern 200 of FIG. 2, the shifter or shift lever is restricted to move along the passageway defined by the outer boundary 202. In other words, the intermediate area 204 disposed between the first section 206 and second section 208 is inaccessible to the shifter or shift lever. As such, the first section 206 of the shift pattern 200 provides all selectable forward ranges and the second section 208 provides all selectable reverse ranges. If the shifter or shift lever is positioned in the transverse section 210, the transmission 136 is shifted into neutral. Moreover, the conventional shift pattern 200 may also include a third section 234 for shifting the transmission 136 into park.

As shown in FIG. 2, each of the first section 206, second section 208, transverse section, and third section 234 includes at least one defined position 212. In the third section 234, for example, the defined position 214 corresponds to park. If the shifter or shift lever is moved into the park position 214, the transmission is shifted into park. Likewise, in the transverse section 210, there can be one or more defined positions 216 corresponding to neutral. As such, if the shifter or shift lever is moved into one of the defined positions 216, the transmission 136 shifts into neutral. In the first section, there are a plurality of defined positions including a first forward position 218, a second forward position 220, a third forward position 222, and a fourth forward position 224. Similarly, in the second section 208, there are a plurality of defined positions including a first reverse position 226, a second reverse position 228, a third reverse position 230, and a fourth reverse position 232. In the shift pattern 200 of FIG. 2, the operator has to move the shifter or shift lever in a U-shaped motion to change the direction from forward to reverse or vice versa. For example, if the motor grader 100 is operating in "forward four" or the fourth forward position 224 and the operator desires to shift the transmission into "reverse four" or the fourth reverse position 232, the operator has to move the shifter or shift lever along the U-shaped passageway defined by the outer boundary or perimeter 202 of the shift pattern 200. With these conventional shift patterns, the operator may have to discontinue controlling a work implement such as the grader blade 132 mounted to the motor grader 100 for a period of time. This can further reduce productivity if the operator has to remove his or her hand from the controls for controlling the blade 132 and onto the shifter or shift lever to complete the shift.

Figure 3:
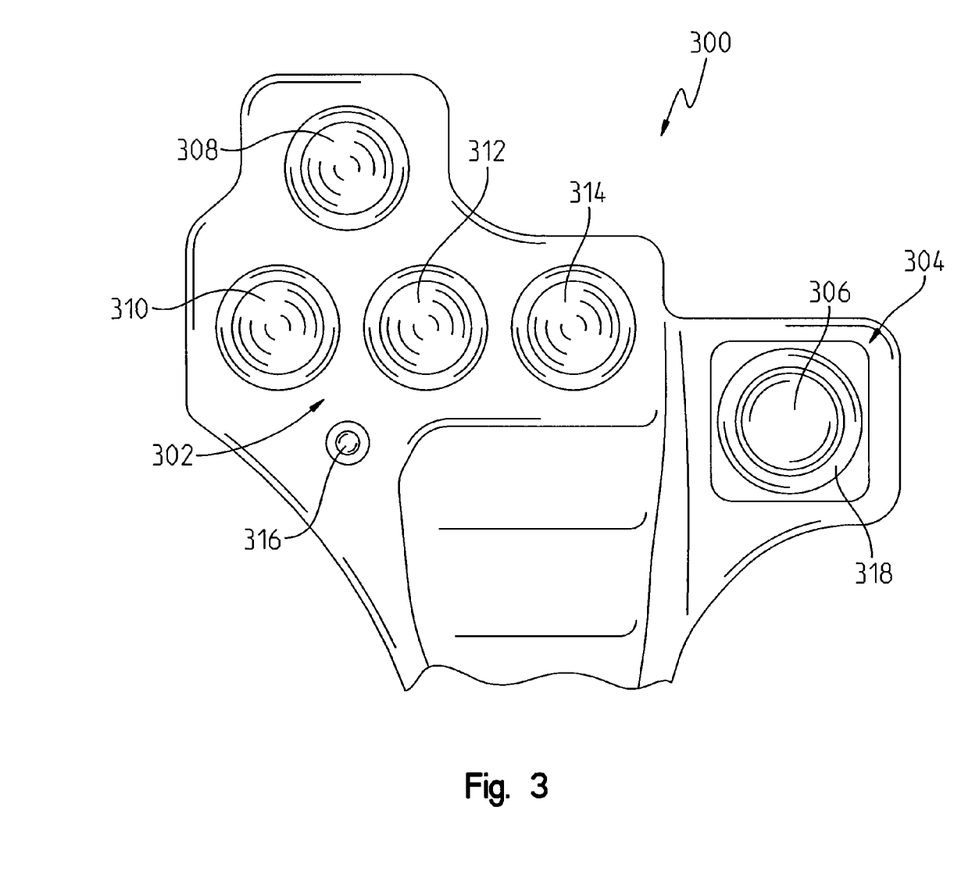
FIG. 3 is a rear perspective view of a unitary control and shift console for use within the cab of a motor grader or other machine.

To overcome or reduce the effects of the obstacles with Y-gate and related conventional shift patterns, the present disclosure provides various embodiments of shift patterns that allow for quick actuation of the shifter or shift lever between ranges and directions. In FIG. 3, an exemplary embodiment of an improved control assembly 300 is shown for being positioned in the operator cab. In this embodiment, the control assembly 300 can be structured to include a control console assembly 302 and a shift console assembly 304. One aspect of this embodiment is the mating or combination of the control console assembly 302 and shift console assembly 304 into a single, integrated console assembly. In many conventional arrangements, each console assembly is spaced from one another. As such, an operator often has to remove his or her hand from one console assembly to operate a control on a different console assembly.

In FIG. 3, however, the control assembly 300 is structured as a single console assembly that integrates the control console assembly 302 and the shift console assembly 304. The control console assembly 302 can include a plurality of controls, switches or joysticks and the shift control assembly 304 can include a shifter 306. The shifter 306 may include a joystick, lever, or other shifting device for controlling the transmission 636. The shift control assembly 304 may also include a control mechanism 318 for allowing the operator to move the shifter 306 into and out of a park position. Unless the operator actuates the control mechanism 318, the transmission 136 may not be shifted into or out of the park position. As such, this provides a safety feature to the machine to avoid an accidental actuation of the shifter 306 into the park position.

The control mechanism 318 can be in the form of a push collar or button, a pull collar or button, a slide control mechanism, a switch, a knob or any other mechanism. As will be further explained, the control mechanism 318 is disposed outside of the perimeter of the shift pattern. Moreover, while the control mechanism 318 is shown positioned on the shift console assembly 304, it may also be positioned on the control console assembly 302 or elsewhere in the cab.

The plurality of controls, switches, or joysticks positioned on the control console assembly 302 can be used to control the machine and its functionality. For instance, the plurality of controls, switches, or joysticks may be used to achieve accurate and precise control during grading operations. In FIG. 3, the control console assembly 302 can support a plurality of joysticks as shown. The plurality of joysticks can include a first joystick 308, a second joystick 310, a third joystick 312, and a fourth joystick 314. In one aspect, the first joystick 308 is positioned towards the front portion of the console assembly 302 and is configured to control the articulation of the machine 600 by moving the joystick 308 forward and backward and controls a ripper or other work tool (not shown) coupled to the rear frame 604 via movement to the left and right. In another aspect, the first joystick 308 may be configured to control the pitch of the blade 632 by moving the joystick 308 forward and backward and controls raising and lowering the ripper or other work tool (not shown) via movement to the left and right.

The second joystick 310 can be positioned rearward of the first joystick 308 and to the far left of the other joysticks. In one aspect, the second joystick 310 can be configured to control the side shift of the grader circle 634 by moving the joystick forward and backward. In another aspect, the second joystick 310 can be configured to control the height of the left end of the blade 632 by moving the joystick forward and backward. The third joystick 310 can be positioned rearward of the first joystick 308 and between the second joystick 308 and fourth joystick 314. In one aspect, the third joystick 308 can be configured to control the lean of the front wheels 606 of the machine 100 by moving the joystick forward and backward. In another aspect, the third joystick 308 can be configured to control side shifting of the blade 632 by moving the joystick forward and backward. The third joystick 308 may also control steering of the machine 600 by moving the joystick to the left and right. In this manner, the third joystick 308 and steering wheel 614 may be used to control steering of the machine 600. Moreover, in other alternative embodiments, steering may be controlled by any of the other controls and joysticks.

The fourth joystick 314 can be positioned rearward of the first joystick 308 and to the right of the second joystick 310 and third joystick 312. The fourth joystick 314 can be configured to control the height of the right end of the blade 634 by moving the joystick forward and backward. Alternatively, the fourth joystick 314 can control the angle of the blade 632 through rotation of the grader circle 634 by moving the joystick to the left and right. Any of the first, second, third, and fourth joysticks can be used to control various aspects of the machine, including features not described above. In addition, other embodiments may include additional joysticks for controlling the same or different features as described.

The control console assembly 302 can further include a differential lock switch 316 for locking and unlocking the machine differential. In other embodiments, the control assembly 300 can include float switches, various button assemblies, or a horn button.

In the control assembly 300 of FIG. 3, the shifter 306 is positioned in close proximity to the first joystick 308, second joystick 310, third joystick 312, and fourth joystick 314. With the control console assembly 302 and shift console assembly 304 integrated into a single control assembly 300, however, each joystick is positioned in close proximity to one another and to the shifter 306. Thus, the machine operator can reach the shifter 306 without having to completely remove his or her hand from the control console assembly 302 and this can further enable the operator to shift the transmission 636 and control the functionality of the machine 600 at the same time.

Figure 4:
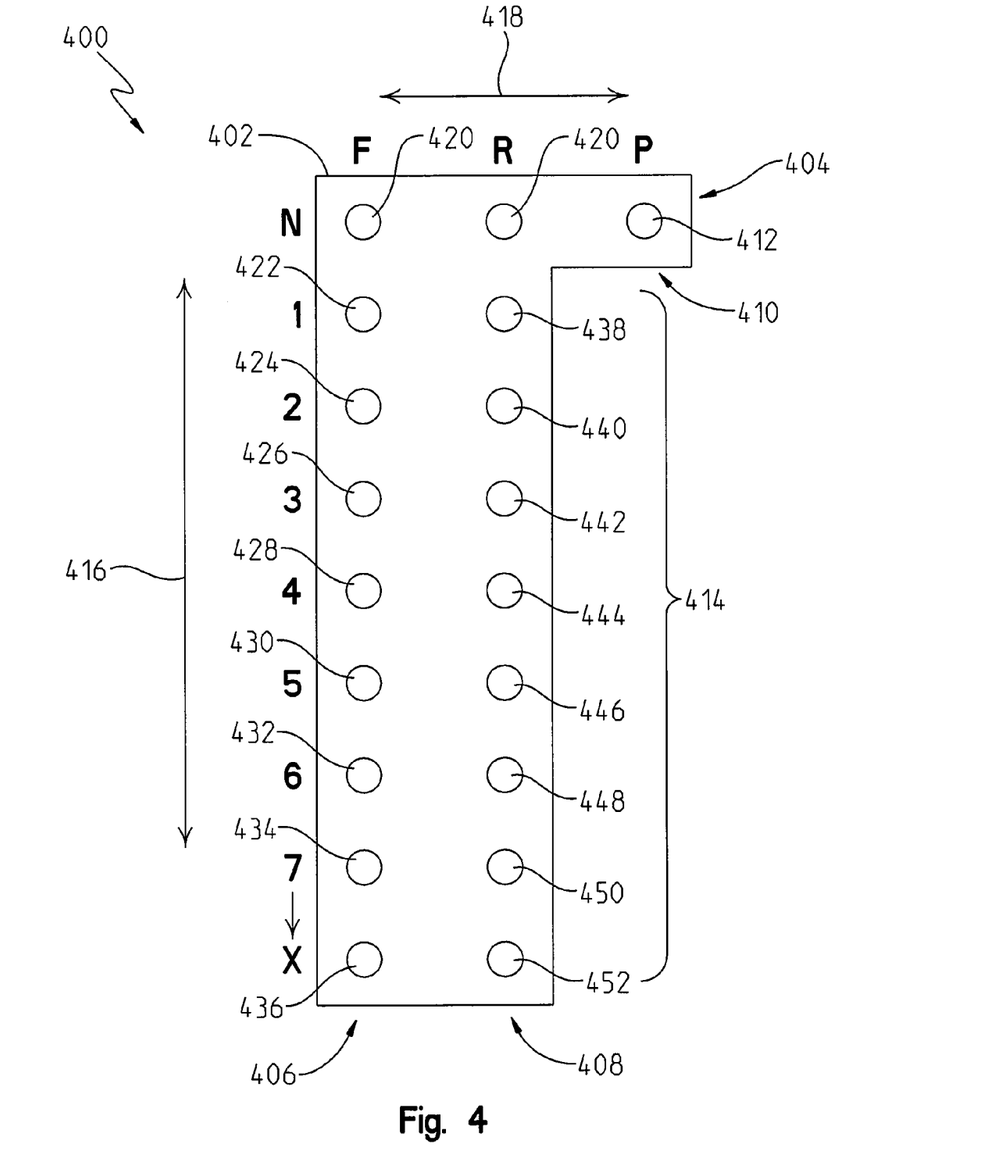
FIG. 4 is a first exemplary open gate shift pattern for the shift console of FIG. 3.

Referring to FIG. 4 of the present disclosure, a first exemplary shift pattern 400 is shown for use with the shifter 306 of FIG. 3. The shift pattern 400 can be referred to as an "open gate" pattern that provides advantages over the "Y-gate" pattern of FIG. 2. In FIG. 4, the shift pattern 400 has an outer perimeter 402 that defines an inner area through which the shifter 306 is moved to control the direction and range or speed of the machine. The outer perimeter 402 can include a portion 410 that protrudes to the right in FIG. 4 such that the open gate shift pattern 400 is structured like an upside-down L. In addition, the shift pattern 400 can be defined by a plurality of columns and rows for controllably shifting the transmission through different ranges or speeds and moving the machine in either a forward or reverse direction. Each of the rows and columns can include one or more defined shift positions. When the shifter 306 is moved to a particular shift position, the transmission can be designed to operate in a particular range (i.e., gear ratio). The particular shift position may also correspond to a forward direction, reverse direction, neutral, or park.

In FIG. 4, a first row or section 404 of the shift pattern 400 can include at least three different shift positions. For example, the machine 100 can be shifted to park by moving the shifter 306 into a park position 412. The park position 412 is located in the protruding portion 410 of the shift pattern 400. As described with reference to FIG. 3, the operator may have to trigger or actuate a control mechanism 318 in the cab to allow the shifter 306 to shift the transmission into and out of the park position 412. This again can prevent the operator from actually moving the shifter 306 into the park position at a time that may damage the transmission. In the first row or section 404 of the shift pattern, a pair of neutral shift positions 420 can be provided. Here, the transmission can be shifted into neutral by moving the shifter 306 into one of the two neutral shift positions 420. In other embodiments, there may be only one neutral position 420, whereas in other embodiments there may be three or more neutral positions 420. In an alternative aspect, the shift pattern 400 may not include the defined park position 412. Instead, an operator may be required to move the control lever or shifter into one of the neutral positions 420 and trigger a switch, button, collar, or similar mechanism (e.g., control mechanism 322) to apply a brake for achieving a "park" condition.

The shift pattern 400 is also configured to include a first column 406 and a second column 408. Each of the first column 406 and second column 408 can include a plurality of shift positions 414 that correspond to a direction and range. In the first column 406, each of the shift positions can correspond to a forward direction, except for the neutral shift position 420 disposed in the first row 404. In the second row 408, each of the shift positions can correspond to a reverse direction, except for the neutral shift position 420 disposed in the first row 404.

As described, the first column 406 of the shift pattern 400 can include a plurality of forward ranges. Here, the shift pattern 400 can include a first forward range 422, a second forward range 424, a third forward range 426, a fourth forward range 428, a fifth forward range 430, a sixth forward range 432, a seventh forward range 434, and an eighth forward range 436. Depending on the gearing of the transmission, a similar shift pattern may include fewer forward ranges or more forward ranges. Similarly, the second column 408 of the shift pattern can include a plurality of reverse ranges. For instance, the shift pattern 400 can include a first reverse range 438, a second reverse range 440, a third reverse range 442, a fourth reverse range 444, a fifth reverse range 446, a sixth reverse range 448, a seventh reverse range 450, and an eighth reverse range 452. Based on the gearing of the transmission, alternative shift patterns may include fewer reverse ranges or more reverse ranges.

In any event, the operator can move the shifter 306 in a longitudinal direction 416 and a lateral direction 418 between directions and ranges. As described above with conventional shift patterns such as the Y-gate shift pattern, the operator has to move the shift pattern in a U-shaped motion to change direction between forward and reverse. In the open gate shift pattern 400 of FIG. 4, however, the operator can quickly shift the transmission between any range and direction with a single movement of the shifter 306. The single movement can be in either the longitudinal direction 416, lateral direction 418, or at any angle. For example, if the shifter 306 is located in the fourth forward position 428 (i.e., commonly referred to as "forward four") and the operator wants to quickly shift the transmission into the fourth reverse position 444 (i.e., "reverse four"), the operator can move the shifter 306 in the lateral direction 418 with a single movement from left to right. Moreover, if the operator wants to shift from the fourth forward position 428 to the sixth reverse position 448, the operator can move the shifter 306 in a single, diagonal motion to the desired position. In effect, this allows the operator to quickly move the shifter 306 to a desired position without having to make three different motions (e.g., the U-shaped pattern) to achieve the desired direction and range.

Figure 5:
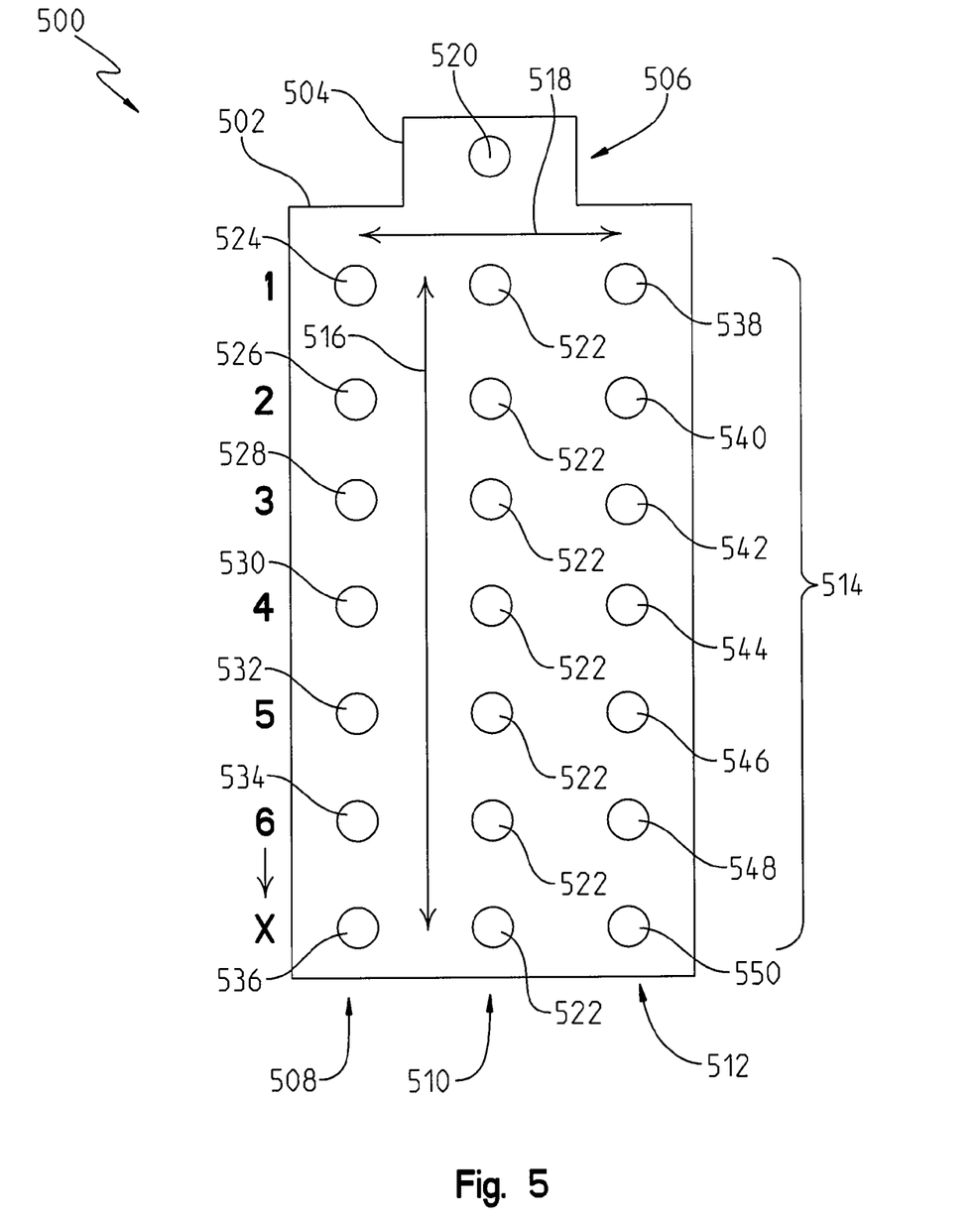
FIG. 5 is a second exemplary open gate shift pattern for the shift console of FIG. 3.

In order to enable this functionality, the shift pattern 400 of FIG. 4 does not include the intermediate, restricted area 204 of the Y-gate shift pattern 200. Thus, the operator can "flick" his or her finger or hand at the shifter 306 in a single movement or step to get the desired range and direction. In FIG. 5, another embodiment of an open gate shift pattern 500 is shown that includes many of the same advantages as the open gate shift pattern 400 shown in FIG. 4. In particular, the shift pattern 500 is defined by an outer perimeter 502 that encloses various shift points for shifting the transmission. Similar to the protruding portion 410 of the outer perimeter 402 in FIG. 4, the outer perimeter 502 in FIG. 5 can also include a protruding portion 504 of the shift pattern 500. In this aspect, the protruding portion 504 is disposed at one end 506 of the shift pattern 500 and can include a defined shift position 520 corresponding to park. Therefore, when the shifter 306 is moved into the shift position 520, the transmission is shifted into park.

The shift pattern 500 can also be divided or separated into three columns as shown in FIG. 5, i.e., a first column 508, a second column 510, and a third column 512. Each column can include a plurality of rows 514. Moreover, in one aspect, the first column 508 can include a plurality of shift positions corresponding to a forward direction. The second column 510 can include a plurality of shift positions corresponding to neutral and the third column 512 can include a plurality of shift positions corresponding to a reverse direction.

In FIG. 5, the plurality of shift positions in the first column 508 can include a first forward position 524, a second forward position 526, a third forward position 528, a fourth forward position 530, a fifth forward position 532, a sixth forward position 534, and a seventh forward position 536. Depending on the internal gearing of the transmission, a similar shift pattern may include additional or fewer forward ranges. The shifter 306 can be moved in a longitudinal direction 516 to select any of the forward ranges in the first column 508. The first forward position 524 can correspond to a higher gear ratio and lower transmission output speed, whereas the seventh forward position 536 can correspond to a lower gear ratio and higher transmission output speed. Each of the forward shift positions can correspond to a different gear ratio and transmission output speed. To select neutral, the shifter 306 can be moved in a lateral direction 518 to any one of a plurality of shift positions 522 disposed in the second column

510. In the shift pattern 500, there can be the same number of shift positions for neutral as there are forward ranges.

The plurality of shift positions in the third column 512 can include a first reverse position 538, a second reverse position 540, a third reverse position 542, a fourth reverse position 544, a fifth reverse position 546, a sixth reverse position 548, and a seventh reverse position 550. Depending on the internal gearing of the transmission, a similar shift pattern may include additional or fewer forward ranges. Similar to the forward ranges, each reverse shift position can correspond to a different gear ratio and output speed.

The nature of the open gate shift pattern 500 is such that there is no intermediate or restricted area between the forward ranges and reverse ranges. This again is similar to the open gate shift pattern 400 of FIG. 4, and contrary to the conventional Y-gate shift pattern shown in FIG. 2. As described with respect to FIG. 4, an operator can shift the transmission between forward and reverse ranges by a single movement of the shifter 306. This can reduce shift time and allows the operator to still maintain control over the machine's work tool or implement.

Another aspect or benefit of the open gate shift patterns 400, 500 of FIGS. 4 and 5 is the positional-indicator of the shifter 306 with respect to the shift pattern. In other words, the location of the shifter 306 in the shift pattern provides a visual indicator of what position or range the transmission is operating in. In effect, the integrated design of the shifter 306 and open-gate shift pattern achieves many of the advantages of sequential and bump shifting without incorporating many of the disadvantages.

With sequential shifting, the transmission shifts incrementally or sequentially between ranges (e.g., first range to second range, second range to third range, etc.). For a manual transmission, the operator manually moves a shifter or shift lever sequentially between ranges, and as a result the current position or range can be determined based on the position or location of the shifter or shift lever. A monitor or display in the cab may also display the corresponding range as well. A downside to sequential shifting, however, is that the shifter or lever is often moved in two or more steps or directions to achieve a desired range (e.g., the operator may have to move the shifter or lever through the U-shaped passageway of the Y-gate shift pattern to shift between forward and reverse ranges). As described above with bump shifting, the shifter is biased to return automatically to a intermediate position, thereby requiring the operator to move or "bump" the shifter multiple times to increase or decrease between multiple ranges. Moreover, the bump shift pattern does not provide any positional-indicator to the operator to suggest what range the transmission is currently shifted to.

With the open gate shift pattern, an operator can shift between any range and direction with a single movement or motion of the shifter, thereby incorporating one of the advantages of bump shifting. In the conventional Y-gate shift pattern 200 of FIG. 2, an operator has to move the lever through the U-shaped pattern to shift between forward and reverse directions. With the open gate shift pattern, however, the operator can move the shifter laterally, longitudinally, or diagonally to shift to any desired range. Moreover, the position of the shifter relative to the layout of the shift pattern provides a visual indication to the operator of what direction and range the transmission is shifted to, thereby incorporating one of the advantages associated with sequential shifting.

In the open gate shift patterns illustrated in FIGS. 4 and 5, the shift pattern has a substantially rectangular or four-sided design (albeit with a protruding portion for a park position). This, however, is not required of the open gate shift pattern. Instead, in an alternative open gate shift pattern, the shift pattern may be triangularly-shaped. The triangularly-shaped shift pattern may include one or more forward and reverse positions defined therein, where each position may correspond to a fixed ratio or a transmission output speed (e.g., as in a continuously-variable transmission). Similar to the shift patterns of FIGS. 4 and 5, an operator may operably select any one of the plurality of forward and reverse positions in the shift pattern via a single movement or motion of the shifter to that desired position. The present disclosure contemplates other designs and structures of open gate shift patterns.

The shifter 306 used in the open-gate shift pattern can be structured to include a multi-function lever with a heavy duty joystick base. The shifter 306 can be any known shift lever, shift control device, joystick, and the like. In one such example, the shifter 306 can include a dual-action joystick that is modified and calibrated for defined positions along a detent. In this example, the shifter 306 can include a first sensor that detects movement of the shifter 306 about one axis (e.g., x-axis) and a second sensor that detects movement about a second axis (e.g., y-axis). Movement along the first axis, for example, may correspond to lateral movement and movement along the second axis may correspond to longitudinal movement. In this aspect, the shifter 306 forms a dual-action or dual-axis shifting mechanism.

The transmission control shifting can be achieved by electronic control so that depending on the movement of the shifter 306, the transmission output speed can be automatically controlled for slowing the machine down when the direction and range are adjusted. This allows the operator to focus on controlling the machine and its functionality rather than having to manually actuate brake pedals and the like to slow the machine down before shifting the transmission between forward and reverse directions. Other known shift control methods besides electronic control can be utilized as well.

The present disclosure and advantages thereof can also be incorporated into a non-step gear transmission, such as a hydrostatic, infinitely-variable, or continuously-variable transmission. In these non-step transmission configurations, there may be no detent corresponding to a specific gear ratio or range. Moreover, a linear speed controller (e.g., a rotary dial) may be used to controller shifting or speed adjustment of the transmission. It may also be possible to use a joystick or lever to control shifting of a non-step transmission, but movement of the joystick or lever may correspond to changes in transmission output speed rather than selecting a defined range and gear ratio.

While exemplary embodiments incorporating the principles of the present disclosure have been described hereinabove, the present disclosure is not limited to the described embodiments. Instead, this application is intended to cover any variations, uses, or adaptations of the disclosure using its general principles. Further, this application is intended to cover such departures from the present disclosure as come within known or customary practice in the art to which this disclosure pertains and which fall within the limits of the appended claims.

The invention claimed is:

1. A control system for a machine having a variable speed drivetrain, the variable speed drivetrain including a plurality of selectable forward and reverse ranges, comprising:

an open gate shift pattern having an outer perimeter and a plurality of defined positions disposed within the outer perimeter, where each of the defined positions corresponds to one of the plurality of selectable forward and reverse ranges of the variable speed drivetrain; and a control lever being movably disposed within the shift pattern, where movement of the control lever induces a change in range;

wherein, a first set of defined positions are aligned in the shift pattern corresponding to each of the plurality of forward ranges, a second set of defined positions are aligned in the shift pattern corresponding to each of the plurality of reverse ranges;

further wherein, the control lever is moveable in a single movement to any of the plurality of defined positions for selecting between a corresponding forward range and reverse range.

2. The control system of claim 1, wherein the first set of defined positions and the second set of defined positions are substantially aligned in a longitudinal direction, the first set of defined positions being laterally spaced from the second set of defined positions.

3. The control system of claim 2, wherein the control lever is moveable laterally between any one of the first set of defined positions and any one of the second set of defined positions.

4. The control system of claim 2, wherein the control lever is moveable in the longitudinal direction between any one of the defined positions in the first set or second set thereof.

5. The control system of claim 1, further comprising at least one defined position in the shift pattern corresponding to neutral.

6. The control system of claim 2, wherein the at least one defined position corresponding to neutral is substantially aligned in a longitudinal or transverse direction with the first set and second set of defined positions.

7. The control system of claim 1, further comprising at least one defined position in the shift pattern corresponding to park.

8. The control system of claim 7, wherein the outer perimeter is substantially rectangular and includes a portion protruding therefrom, the at least one defined position corresponding to park being disposed within the protruding portion of the outer perimeter.

9. A motor grader, comprising:
a front frame and a rear frame;
a traction device positioned to support the front frame and rear frame;
an engine and a variable speed drivetrain, the variable speed drivetrain including a plurality of selectable forward and reverse ranges;
a cab mounted to either the front frame or rear frame;
a control system disposed in the cab, the control system including a plurality of inputs configured to control at least one function of the motor grader; and
a shift assembly disposed in the cab and comprising an open gate shift pattern and a control lever moveably disposed within the shift pattern, the shift pattern having an outer perimeter and a plurality of defined positions disposed within the outer perimeter, where each of the defined positions corresponds to one of the plurality of forward and reverse ranges of the variable speed drivetrain;
wherein, a first set of defined positions correspond to one or more forward ranges and a second set of defined positions correspond to one or more reverse ranges;
further wherein, the control lever is moveable in a single movement to any of the plurality of defined positions for selecting between one forward range and one reverse range.

10. The motor grader of claim 9, further comprising a console positioned in the cab, the console supporting the control system and shift assembly.

11. The motor grader of claim 9, further comprising at least one defined position in the shift pattern corresponding to neutral.

12. The motor grader of claim 9, further comprising at least one defined position in the shift pattern corresponding to park.

13. The motor grader of claim 9, wherein the control lever is movable in the shift pattern in a lateral direction, a longitudinal direction, or at any angle therebetween.

14. The motor grader of claim 9, wherein the first set of defined positions and the second set of defined positions are substantially aligned in one direction, the first set of defined positions being spaced from the second set of defined positions.

15. The motor grader of claim 14, further comprising a defined position in the shift pattern corresponding to neutral;
wherein, the first set of defined position and second set of defined positions are spaced from one another and the defined position corresponding to neutral is at least partially disposed therebetween.

16. A construction machine, comprising:
a chassis;
a traction device positioned to support and propel the chassis;
a variable speed drivetrain mounted to the chassis, the variable speed drivetrain including a plurality of selectable forward and reverse ranges;
a cab supported by the chassis;
a controls console disposed in the cab, the controls console including a control system for controlling the machine; and
a shift assembly integrated into the controls console in the cab, the shift assembly comprising:
an open gate shift pattern having an outer perimeter and a plurality of defined positions disposed within the outer perimeter, where each of the defined positions corresponds to one of the plurality of selectable forward and reverse ranges of the drivetrain; and
a control lever being movably disposed within the shift pattern, where movement of the control lever induces a change in range;
wherein, a first set of defined positions is aligned in the shift pattern corresponding to each of the plurality of forward ranges and a second set of defined positions is aligned in the shift pattern corresponding to each of the plurality of reverse ranges;
further wherein, the control lever is moveable in a single linear motion to any of the plurality of defined positions for selecting between a corresponding forward range and a reverse range.

17. The construction machine of claim 16, further comprising at least one defined position in the shift pattern corresponding to neutral.

18. The construction machine of claim 17, wherein the first set of defined positions and second set of defined positions are spaced from one another and the at least one defined position corresponding to neutral is at least partially disposed therebetween.

19. The construction machine of claim 16, further comprising at least one defined position in the shift pattern corresponding to park.

20. The construction machine of claim 16, wherein:
the first set of defined positions is aligned in one direction in the shift pattern;

the second set of defined positions is substantially aligned in a second direction and spaced from the first set of defined positions, where the first direction and second direction are parallel, perpendicular, or angularly disposed relative to one another; and a third set of defined positions including at least one position corresponding to neutral and one position corresponding to park, the at least one defined position corresponding to neutral being spaced from the first set and second set of defined positions;

further wherein, the control lever is moveable between the first set, second set, and third set of defined positions in a lateral direction, a longitudinal direction, or an angular direction relative to the lateral and longitudinal directions.

* * * * *